(12) United States Patent
Hino

(10) Patent No.: US 8,531,085 B2
(45) Date of Patent: Sep. 10, 2013

(54) VIBRATION ACTUATOR AND ELECTRIC DEVICE

(75) Inventor: Mitsuteru Hino, Tokyo (JP)

(73) Assignee: Nikon Corporation, Tokyo (JP)

( * ) Notice: Subject to any disclaimer, the term of this patent is extended or adjusted under 35 U.S.C. 154(b) by 428 days.

(21) Appl. No.: 12/785,817

(22) Filed: May 24, 2010

(65) Prior Publication Data

US 2010/0300222 A1 Dec. 2, 2010

(30) Foreign Application Priority Data

May 26, 2009 (JP) ................................. 2009-126126
May 21, 2010 (JP) ................................. 2010-117169

(51) Int. Cl.
*H02N 2/00* (2006.01)

(52) U.S. Cl.
USPC ............. 310/323.17; 310/323.01; 310/323.18

(58) Field of Classification Search
USPC ............. 310/323.01–323.05, 323.08, 323.09, 310/323.17, 323.18
See application file for complete search history.

(56) References Cited

U.S. PATENT DOCUMENTS

| | | | | |
|---|---|---|---|---|
| 3,387,901 A * | 6/1968 | Williams | ...................... | 384/576 |
| 5,479,231 A * | 12/1995 | Tanaka | ........................... | 396/418 |
| 6,628,046 B2 * | 9/2003 | Seki | ......................... | 310/323.04 |
| 8,035,276 B2 * | 10/2011 | Ashizawa | ................ | 310/323.04 |
| 2002/0101134 A1 * | 8/2002 | Tsukimoto et al. | ...... | 310/323.03 |
| 2006/0113867 A1 | 6/2006 | Sakatani et al. | | |
| 2006/0267454 A1 * | 11/2006 | Ashizawa et al. | ........ | 310/323.02 |
| 2011/0057542 A1 * | 3/2011 | Kudo | ........................ | 310/323.02 |
| 2011/0280559 A1 * | 11/2011 | Ashizawa et al. | ............. | 396/133 |

FOREIGN PATENT DOCUMENTS

| JP | A-4-150781 | 5/1992 |
|---|---|---|
| JP | A-10-319300 | 12/1998 |
| JP | A-2002-48142 | 2/2002 |
| JP | A-2006-158053 | 6/2006 |
| JP | A-2006-271143 | 10/2006 |
| JP | A-2007-202310 | 8/2007 |

OTHER PUBLICATIONS

Office Action issued in Japanese Patent Application No. 2010-117169, mailed Aug. 23, 2011 (with translation).
Office Action issued in Japanese Patent Application No. 2010-117169, mailed May 22, 2012 (with translation).

* cited by examiner

*Primary Examiner* — Thomas Dougherty
(74) *Attorney, Agent, or Firm* — Oliff & Berridge, PLC

(57) ABSTRACT

A vibration actuator comprising: a vibration portion which contacts a relative movement portion, and produces necessary vibration for a relative movement of the relative movement portion; a first member provided to hold the relative movement portion between the first member and the vibration portion, and moves relative to the vibration portion in response to movement of the relative movement portion with respect to the vibration portion; a second member which faces the first member via a rolling member, and supports the first member so that the first member is movable relative to the vibration portion; and a pressing member which generate a pressing force between the second member and the vibration portion so that the vibration portion and the relative movement portion are in contact with each othercome in contact with each other; and wherein the first member comprises a plastic substance.

12 Claims, 5 Drawing Sheets

VIBRATION ACTUATOR AND ELECTRIC DEVICE

The present application claims priority under 35 U.S.C. §119 to Japanese Patent Applications No. 2009-126126 filed on May 26, 2009, and No. 2010-117169 filed on May 21, 2010. The content of the application is incorporated herein by reference in its entirety.

BACKGROUND OF THE INVENTION

1. Field of the Invention

The present invention relates to a vibration actuator and an electric device.

2. Description of the Related Art

There has been a vibration actuator wherein an vibrating element is made to vibrate using an electromechanical conversion element, and a moving element is made to rotate by these vibrations. In such an vibration actuator, a bearing is used in order to hold the moving element so as to be rotatable with respect to the vibrating element (for example, refer to Japanese Unexamined Patent Publication No. Hei 10-319300). Thus far, metal has been used as the material for this bearing.

SUMMARY OF THE INVENTION

However, when using metal as the bearing material, the cost becomes high, and the weight increases.

A problem to be solved by the present invention is to provide a vibration actuator which has favorable characteristics.

The present invention solves the above described problem by the following means.

According to the first aspect of the present invention, there is provided a vibration actuator comprising: a vibration portion which contacts a relative movement portion, and which produces necessary vibration for a relative movement of the relative movement portion; a first member which is provided so as to hold the relative movement portion between the first member and the vibration portion, and which moves relative to the vibration portion in response to movement of the relative movement portion with respect to the vibration portion; a second member which faces the first member via a rolling member, and which supports the first member so that the first member is movable relative to the vibration portion; and a pressing member which gives rise to a pressing force between the second member and the vibration portion so that the vibration portion and the relative movement portion are in contact with each othercome in contact with each other; and wherein the first member comprises a plastic substance.

The first member may comprise a connection portion which is capable of connecting to the outside, at an outer circumferential face in a direction of relative movement of the vibration portion and the relative movement portion, and in a direction orthogonal to the direction of the pressing force.

The connection portion may be a gear which transmits power.

The relative movement portion and the vibration portion may relatively rotate about a central rotation axis.

The rolling member may be provided between an outer circumferential face of the second member and an inner circumferential face of the first member.

The first member may face the second member in a direction of relative movement of the vibration portion and the relative movement portion, and a direction orthogonal to a direction of the pressing force.

The rolling member may be provided between the first member and the second member, when seen in a direction of the pressing force.

The vibration actuator may further comprise a vibration absorption member provided between the relative movement portion and the first member when seen in a direction of the pressing force.

The first member may be made of plastic.

The second member may comprise a plastic substance.

The rolling member may be a metal sphere.

The rolling member may be held by a retainer made of plastic.

According to the second aspect of the present invention, there is provided an electric device comprising the above mentioned vibration actuator.

Further, the above constitution may be suitably improved, or at least partially substituted with other constitutional elements.

According to the present invention, it is possible to provide a vibration actuator and electric device having favorable characteristics.

DETAILED DESCRIPTION OF THE INVENTION

First Embodiment

Below, the first embodiment of the present invention will be explained with reference to the drawings and the like. Further, in each of the following drawings, in order to facilitate the explanations and understanding, an XYZ Cartesian coordinate system is established. In this coordinate system, in the position of the camera when photographing an image in the landscape orientation with the photographer making the optical axis A horizontal (below referred to as the normal position), the direction towards the left side as seen by the photographer is the X-plus direction. Further, in the normal position, the upwards direction is the Y-plus direction. Furthermore, in the normal position, the direction towards the subject is the 1-plus direction.

Figure 1:
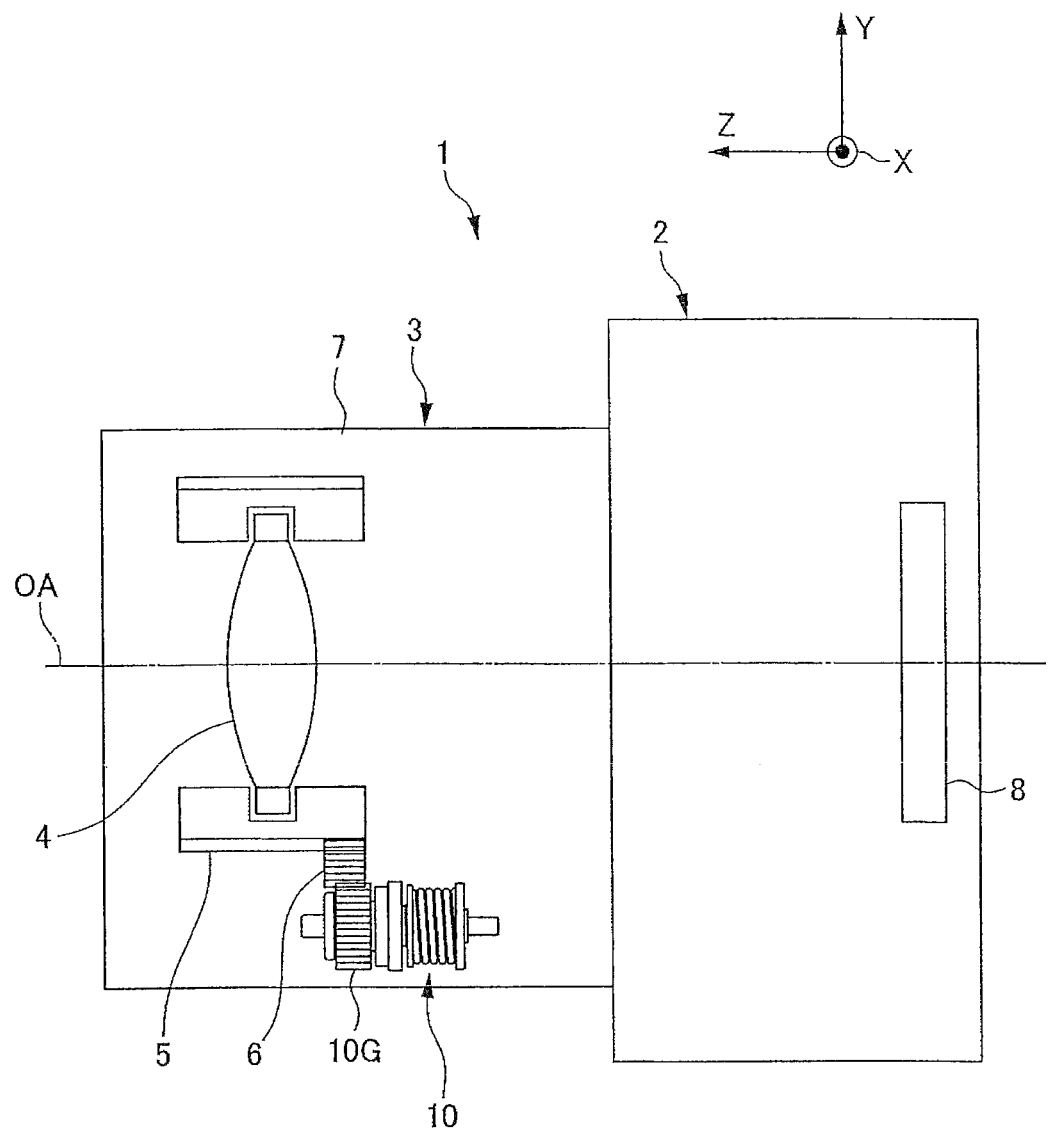
FIG. 1 is a conceptual drawing explaining the camera of one embodiment of the present invention.

FIG. 1 is a conceptual drawing explaining the camera 1 of the first embodiment. In the camera 1 of the first embodiment, an ultrasonic motor 10 is provided as an example of the vibration actuator.

The camera 1 is provided with a camera body 2 having an image sensor 8, and a lens barrel 3. The lens barrel 3 is an interchangeable lens which is detachable from the camera body 2. Further, in the present embodiment, the lens barrel 3 is shown by an example which is an interchangeable lens, but without being limited to this, for example, the lens barrel may be one which is integrated with the camera body.

The lens barrel 3 is provided with the focusing lens 4, cam tube 5, idler gear 6, ultrasonic motor 10, and a case body 7 which encases them.

In the first embodiment, the ultrasonic motor 10 is disposed in the annular space between the cam tube 5 and the case body 7. The ultrasonic motor 10 is a driving source which drives the focusing lens 4 during the focusing operation of the camera 1. The ultrasonic motor 10 rotationally drives the cam tube 5 via the idler gear 6 engaged with the output gear 10G of the ultrasonic motor 10.

The cam tube 5 is provided to be movable in a direction parallel to the optical axis OA (Z axis direction) in the case body 7, by rotational operation by the ultrasonic motor 10.

The focusing lens 4 is held at the cam tube 5. Then, focus point adjustment is carried out by moving in the optical axis OA direction by movement of the cam tube 5 by the driving of the ultrasonic motor 10.

Further, while not shown in the drawings, the lens barrel 3 is provided with a plurality of lens groups in addition to the focusing lens 4.

In FIG. 1, a object image is imaged at the imaging face of the image sensor 8 by the lens group including the focusing lens 4 provided in the lens barrel 3. The imaged object image is converted to an electric signal by the image sensor 8, and imaging data is obtained by A/D conversion of this signal.

Next, the ultrasonic motor 10 as the first embodiment is explained in detail with reference to FIG. 2.

Figure 2:
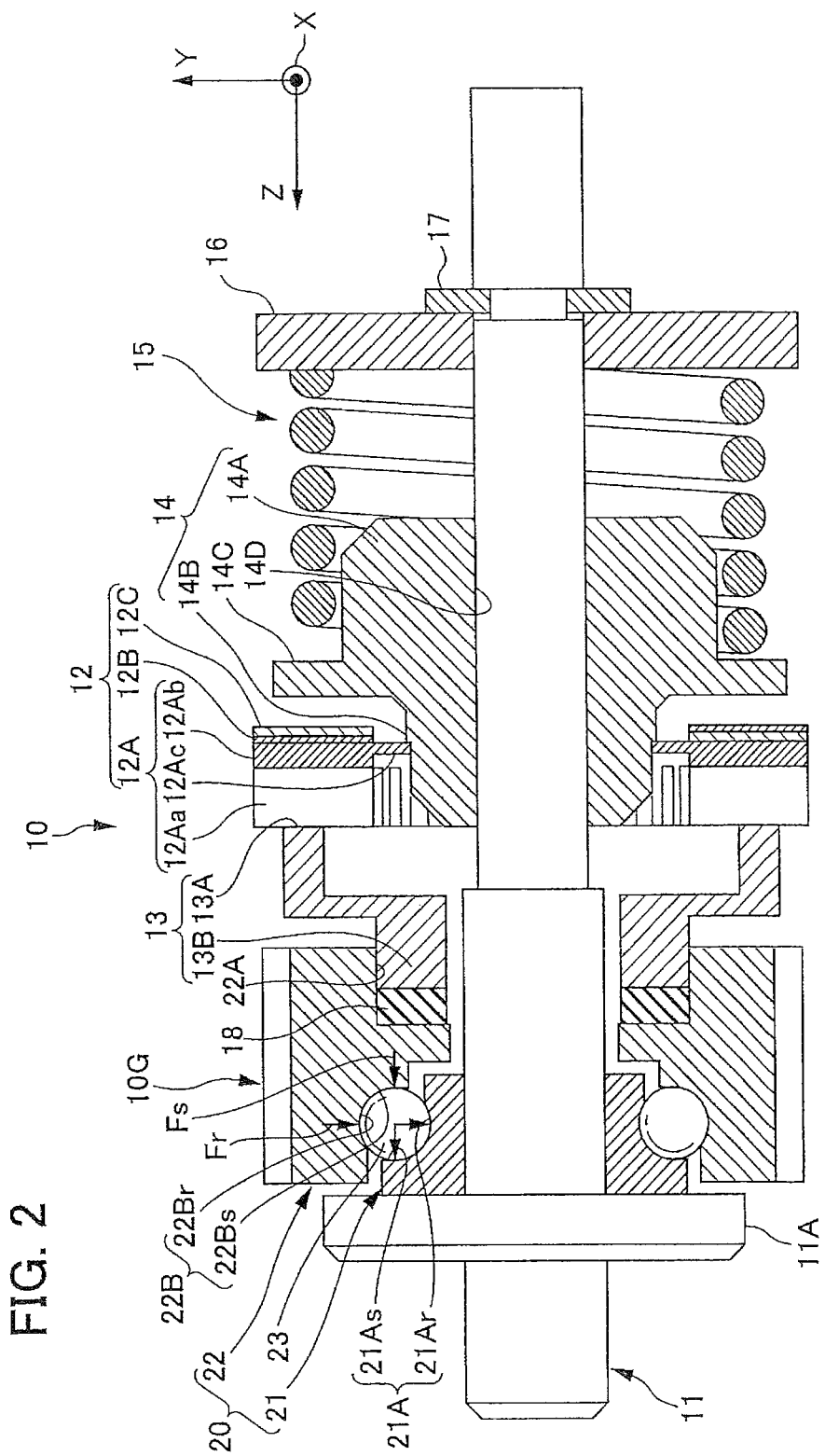
FIG. 2 is a longitudinal cross section drawing of an ultrasonic motor.

FIG. 2 is a longitudinal (in the axial direction) cross section drawing of the ultrasonic motor 10.

The ultrasonic motor 10 is provided with a support shaft 11 which is disposed to pass through its center, an vibrating element 12, a rotating body 13 which is rotationally driven by the vibrating element 12, a support body 14 which supports the vibrating element 12, and a bearing 20 which supports the rotating body 13 so as to freely rotate. Further, the ultrasonic motor 10 is provided with a pressing spring 15 which pressure-energizes the vibrating element 12 towards the rotating body 13, and a stopping washer 16 which regulates the position of the pressing spring 15 with respect to the support shaft 11. In the present embodiment, the vibrating element 12 is a fixed side, and is formed so that does not rotate with respect to the support shaft 11, while it rotationally drives the rotating body 13 with respect to the support shaft 11.

The support shaft 11 is a shaft of a predetermined diameter, and at one end (the Z axis plus side) the flange 11A having a large diameter is formed. At the other end of the support shaft 11, the stopping washer 16 is mounted. The stopping washer 16 is provided so as to be unable to move towards the Z axis minus side by engaging with a retaining ring 17 which is an E ring or the like mounted at the outer end side of the support shaft 11.

The vibrating element 12 is a member whose overall form is hollow, and is constituted by the elastic body 12A and the piezoelectric body 12B which is joined to the elastic body 12A.

The elastic body 12A is formed as a hollow annulus whose outer form is approximately circular, of a metal material having a high degree of resonance acuteness. The elastic body 12A has a comb tooth portion 12Aa, a base portion 12Ab, and a flange portion 12Ac, and the like.

The comb tooth portion 12Aa has a plurality of grooves of a predetermined width in the circumferential direction with a predetermined spacing and to a predetermined depth, formed from a face of the side facing the rotating body 13 of the elastic body 12A. The front face of the comb tooth portion 12Aa (the face of the elastic body 12A which faces the rotating body 13) press-contacts the rotating body 13 and is the driving, face 12Ad which drives the rotating body 13, and a lubricant surface treatment such as Ni—P (nickel-phosphorous) plating or the like is usually applied thereto. Further, the reason for providing the comb tooth portion 12Aa is to bring the neutral plane of the progressing wave arising at the driving face 12Ad by the expansion and contraction of the piezoelectric body 12B as close as possible to the piezoelectric body 12B side, an in this way to amplify the amplitude of the progressing wave of the driving face 12Ad.

The base portion 12Ab is the part on the opposite side of the comb tooth portion 12Aa of the elastic body 12A (on the Z axis minus side in the drawing) on which the grooves of the comb tooth portion 12Aa are not formed, and is continuous in the circumferential direction of the elastic body 12A.

The flange portion 12Ac is a portion of a small diameter which protrudes to a predetermined thickness at the inner circumference side of the elastic body 12A. By this flange body 12Ac, the vibrating element 12 is supported at the support body 14.

The piezoelectric body 12B has an approximately plate-like shape, and is joined by an adhesive to the face of the base portion 12Ab side of the elastic body 12A (the side of the elastic body 12A at the opposite side to the rotating body 13).

The piezoelectric body 12B is an electromechanical conversion element which converts electrical energy into mechanical energy. Further, in the present embodiment, a piezoelectric element is used as the piezoelectric body 12B, but it is also possible to use an electrostrictive element or the like.

The piezoelectric body 12B is provided with two electrodes, not shown in the drawing, for inputting a driving signal.

The flexible printed circuit board 12C is disposed at the face at the opposite side of the elastic body 12A of the piezoelectric body 12B.

The wiring of the flexible printed circuit board 12C is connected to the electrodes of the piezoelectric body 12B.

The flexible printed circuit board 12C has the function of providing a driving signal to the piezoelectric body 12B. Progressing waves are generated at the driving face of the elastic body 12A when the elastic body 12A is excited by the expansion and contraction of the piezoelectric body 12B, by the driving signal provided from this flexible printed circuit board 12C. In the present embodiment, a four wave progressing wave is generated.

The rotating body 13 is a member which is rotationally driven by the progressing wave arising at the driving face 12Ad of the elastic body 12A.

The rotating body 13 is formed with an approximately discoid shape of a light metal such as aluminum or the like, and has a contact face 13A which has an approximately annular shape and contacts the vibrating element 12 (the driving face 12Ad of the elastic body 12A), and a joining portion 13B which has a cylindrical shape with a small diameter and joins to the bearing 20 (outer wheel 22). The contact face 13A is given a surface treatment of alumite or the like to increase the abrasion resistance.

The joining portion 13B of the rotating body 13 fits at the joining portion 22A of the outer wheel 22 of the later described bearing 20 via the damping member 18 and is joined without allowing rotation relative to the outer wheel 22.

The support body 14 which supports the vibrating element 12 has a main body portion 14A of a predetermined outer diameter, a support portion 14B which fits at the flange portion 12Ac of the vibrating element 12, and a pressing flange 14C having a large diameter, which is formed between the main body portion 14A and the support portion 14B and exhibits an approximately discoid shape. Further, a mounting hole 14D which fits the support shaft 11 so as to be slidably movable is formed at the central portion of the support body 14.

The support body 14 fits the support shaft 11 at the mounting hole 14D, and its support portion 148 fits to the flange portion 12Ac of the vibrating element 12, and in this way, the vibrating element 12 is concentrically supported about the support shaft 11.

A pressing spring 15 is disposed between the pressing flange 14C of the support body 14 and the stopping washer 16 mounted at the shaft end of the support shaft 11.

The pressure spring 15 is a coil spring which gives rise to an elastic return force by compressive deformation, and it is disposed such that the main body portion 14A of the support body 14 is fit at its inner circumference. Further, this elastic return force pressure-energizes the pressing flange 14C (namely the support body 14) in a direction away from the stopping washer 16.

The bearing 20 is provided with the inner wheel 21, the outer wheel 22, and the ball 23 disposed between the inner wheel 21 and the outer wheel 22, and is constituted to allow free relative rotation between the inner wheel 21 and the outer wheel 22 with low friction by the rolling of the ball 23.

The outer wheel 22 is provided with the joining portion 22A at its inner circumference, which is joined with the rotating body 13. Further, the output gear 10G is formed at the outer circumference of the outer wheel 22. In other words, the outer wheel 22 has the function of supporting the rotating body 13, and the function of outputting the rotational power of the rotating body 13 to the outside.

The inner wheel 21 of the bearing 20 is fit to the support shaft 11 without allowing relative rotation, and one end face thereof (the Z axis plus side) abuts the flange 11A of the support shaft 11.

The joining portion 138 of the rotating body 13 is fit to the joining portion 22A of the outer wheel 22 of the bearing 20, and joined thereto via the damping member 18. In this way, the bearing 20 supports the rotating body 13 so as to be freely rotatable. Further, the constitution of this bearing 20 will be explained later in more detail.

The damping member 18 is a member of approximately annular shape having a predetermined thickness and formed of an elastic body such as rubber or the like.

The damping member 18 is disposed between the end face of the joining portion 13B of the rotating body 13, and the end face of the joining portion 22A of the outer wheel 22 of the bearing 20, and joins the two without allowing relative rotation. The damping member 18 has the function of making the rotating body 13 and the outer wheel 22 of the bearing 20 integrally rotatable by its viscoelasticity, and the function of absorbing the vibrations of the rotating body 13 so that they are not transmitted to the outer wheel 22. The damping member 18 is formed of, for example, butyl rubber, silicon rubber, propylene rubber, and the like.

In an ultrasonic motor 10 constituted as above, the vibrating element 12 is pressure-energized towards the rotating body 13 by the elastic return force of the pressing spring 15 via the support body 14, and the driving face 12Ad is press-contacted to the contact face 13A by a predetermined force. Then, when two alternating current driving waveforms having different phases are input to the two electrodes of the piezoelectric body 12B of the vibrating element 12, a progressing wave is generated at the rotating body 13 side of the elastic body 12A by the deformation of the piezoelectric body 12B. The rotating body 13 (contact face 13A) which press-contacts the vibrating element 12 (driving face 12Ad) is friction driven to rotate by these progressing waves. The rotations of the rotating body 13 are transmitted to the outer wheel 22 of the bearing 20 via the damping member 18, and the outer wheel 22, namely the output gear 10G, rotates, and the rotational power is output to the outside.

Next, a more detailed explanation will be given of the bearing 20 of the first embodiment.

As mentioned above, the bearing 20 is provided with the inner wheel 21, the outer wheel 22, and the ball 23. Further, the bearing 20 is disposed at the right side (Z axis minus side) in FIG. 2 of the flange 11A with the inner wheel 21 fit to the support shaft 11 without allowing relative rotation, and receives the energizing force (the energizing force which pushes the vibrating element 12 to the rotating body 13) of the pressing spring 15 acting via the vibrating element 12 and the rotation body 13, and supports the rotating body 13 so as to be freely rotatable.

Namely, at the Z axis minus side of the bearing 20, the rotating body 13, the vibrating element 12, the support body 14, and the pressing spring 15 are disposed in series in the axial direction of the support shaft 11, and the pressing force generated from the pressing spring 15 which presses the vibrating element 12 to the rotating body 13 is act on the outer wheel 22.

The inner wheel 21 is an annular shape having an inner diameter portion into which the support shaft 11 can fit, and is formed with a predetermined thickness in the radial direction. At its outer circumference, there is formed in the circumferential direction an inner rolling face 21A where the ball 23 rolls.

The inner rolling face 21A is formed with an arc-shaped cross sectional form conforming to the spherical surface of the ball 23, and has the radial inner face portion 21Ar which faces the outer side in the radial direction, and the thrust inner face portion 21As orthogonal to the Z axis and which faces the Z axis minus direction.

The outer wheel 22 has a shape which is annular in outline, but as explained above, the output gear 10G is formed at its outer circumference. At the inner circumference of the outer wheel 22, the joining portion 22A with which the rotating body 13 is joined, and the outer rolling face 22B on which the ball 23 rolls, are respectively formed in the circumferential direction.

The joining portion 22A has a recessed shape with a circular inner diameter into which the joining portion 13B of the rotating body 13 can be inserted and fit, and is open at the side where the rotating body 13 of the outer wheel 22 is disposed (the Z axis minus side).

The outer rolling face 22B is formed with an arc-shaped cross sectional form conforming to the spherical surface of the ball 23, and has the radial outer face portion 22Br which faces the inner side of the radial direction, and the thrust outer face portion 22Br orthogonal to the Z axis and which faces the Z axis plus side. Namely, the outer wheel 22 is integrally formed with a portion (the joining portion 22A) which holds the rotating body 13.

The ball 23 is a rollable sphere interposed between the inner rolling face 21A of the inner wheel 21, and the outer rolling face 22B of the outer wheel 22, and a plurality are disposed around the whole circumference between the inner wheel 21 (inner rolling face 21A) and the outer wheel 22 (outer rolling face 22B).

Here, the inner wheel 21 and outer wheel 22 are manufactured of a substance having plasticity, in particular a plastic material which is easily moldable. However, without being limited to this, they may also be, for example, a thermoplastic material, a resin, a celluloid, a high polymer material and the like.

The inner wheel 21 and the outer wheel 22 are respectively formed by injection molding or the like of a plastic material. As the plastic material, for example, polyacetal, polyether ether ketone, polybutylene terephthalate, polycarbonate and the like may be used.

On the other hand, the ball 23 is formed of a metal material such as a stainless alloy steel or the like, or a material such as a ceramic or the like. The outer wheel 22 has a lower hardness than the ball 23, and a higher flexibility than the ball 23.

In the bearing 20 with the above constitution, the outer wheel 22 can relatively rotate with respect to the inner wheel 21 mounted and fixed to the support shaft 11, by the rolling of the balls 23.

The power (thrust force Fs) by the energizing of the pressing spring 15 in the Z axis direction via the rotating body 13, as well as the driving counterforce (radial force Fr) in a direction orthogonal to the rotation axis (=Z axis direction) when the output gear 10G outputs the rotational power to the outside, act on the outer wheel 22 of the bearing 20.

The thrust force Fs acts on the thrust inner face portion 21As of the inner rolling face 21A of the inner wheel 21 via the ball 23, from the thrust outer face portion 22B of the outer rolling face 22B of the outer wheel 22. In this way, the bearing 20 receives the thrust force Fs with the thrust inner face portion 21As, and the outer wheel 22 is smoothly rotatable.

Further, the radial force Fr acts on the radial inner face portion 21Ar of the inner rolling face 21A of the inner wheel 21 via the ball 23, from the radial outer face portion 22Br of the outer rolling face 22B of the outer wheel 22. In this way, the bearing 20 receives the radial force Fr at the radial inner face portion 21Ar, and the outer wheel 22 is smoothly rotatable without eccentricity.

In this way, the bearing 20 is provided with both functions of a thrust bearing and a radial bearing.

As described above, the bearing 20 is able to stably and rotatably support the rotating body 13 while resisting the thrust force Fs by the pressing spring 15 acts on the outer wheel 22 via the rotating body 13. Further, it is able to allow the outer wheel 22 to stably rotate, preventing eccentricity, while resisting the radial force Fr arising when the output gear 10G engages with and drives the gears of the side of the load to be driven. As a result, it is possible to output to the outside the rotational force with little fluctuation in speed, via the outer wheel (output gear 10G).

In the present embodiment, the inner wheel 21 and outer wheel 22 of the bearing 20 are formed of a plastic material. Because of this, the outer wheel 22 and the output gear 10G can be integrally formed, and can be manufactured at low cost. If the inner wheel 21 and the outer wheel 22 of the present embodiment were, for example, formed of metal as in the conventional manner, gear machining and cutting machining would be necessary, which would incur greatly higher costs. If they were constituted of different materials and assembled, the costs would also increase because of the increased number of parts and assembly stages. This does not occur in the present embodiment. Further, the constitution can be made light. In addition, what the ball 23 contacts is the inner wheel 21 and the outer wheel 22, which are made of plastic, thus there is no mutual contact of metals, and it is possible to design the bearing 20 to be quiet when operating.

Further, in the present embodiment, the joining portion 22A which joins to the rotating body 13 is formed at the inner diameter side of the outer wheel 22 which has the output gear 10G formed on its outer diameter side. In this way, the overall length of the ultrasonic motor 10 can be shortened. In contrast, if the joining portion 22A were not provided and the outer wheel 22 and the rotating body 13 were disposed in series, in order to maintain the same tooth width of the output gear 10G as in the present embodiment, the length of the ultrasonic motor 10 in the axial direction would have to be increased. In the present embodiment, it is possible to compactly constitute an ultrasonic motor 10 having an output gear 10G with a wide facewidth.

Second Embodiment

Next, the second embodiment of the present invention will be explained with reference to FIG. 3 and FIG. 4.

Figure 3:
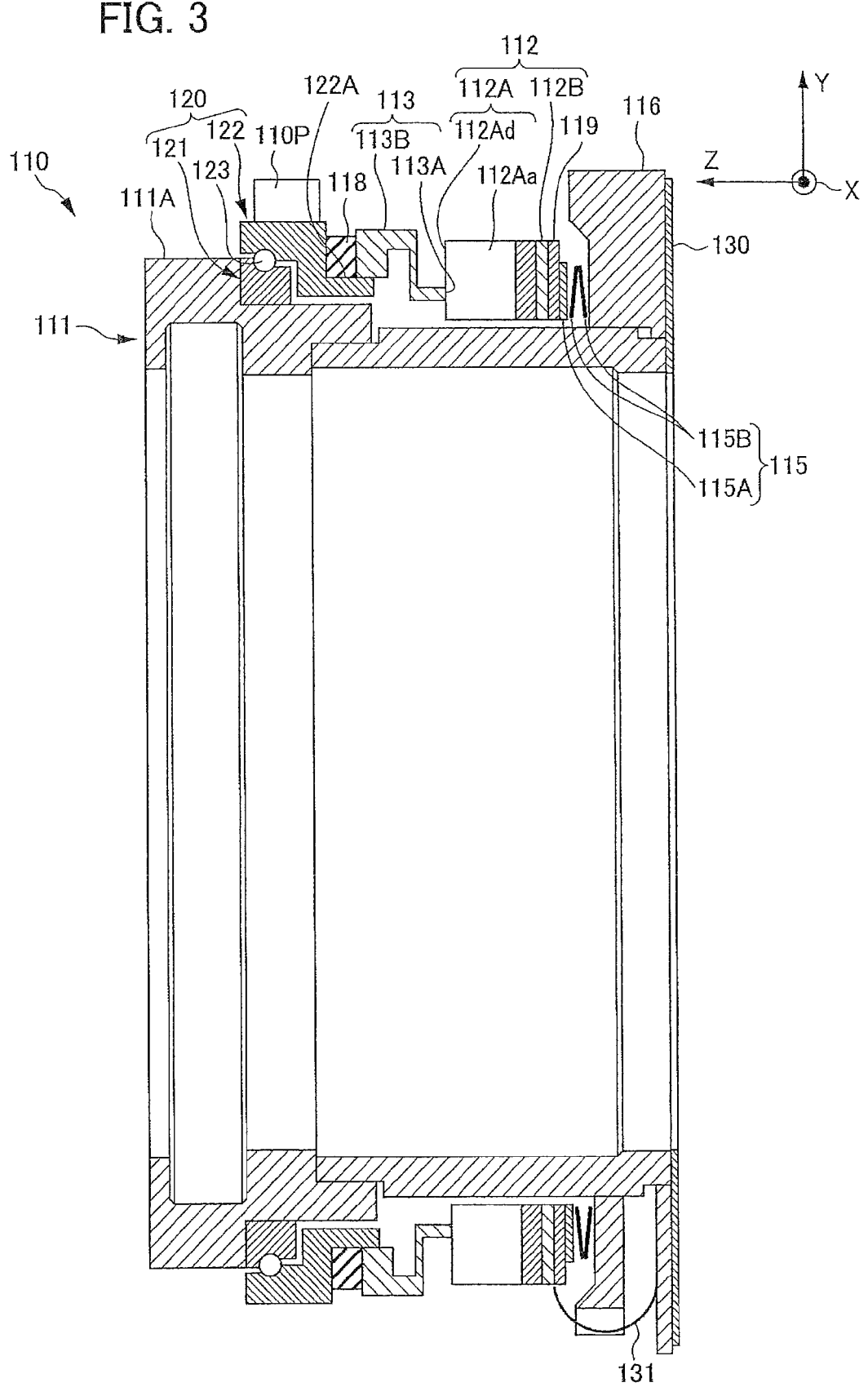
FIG. 3 is a longitudinal cross section drawing of an ultrasonic motor according to the second embodiment of the present invention.
Figure 4:
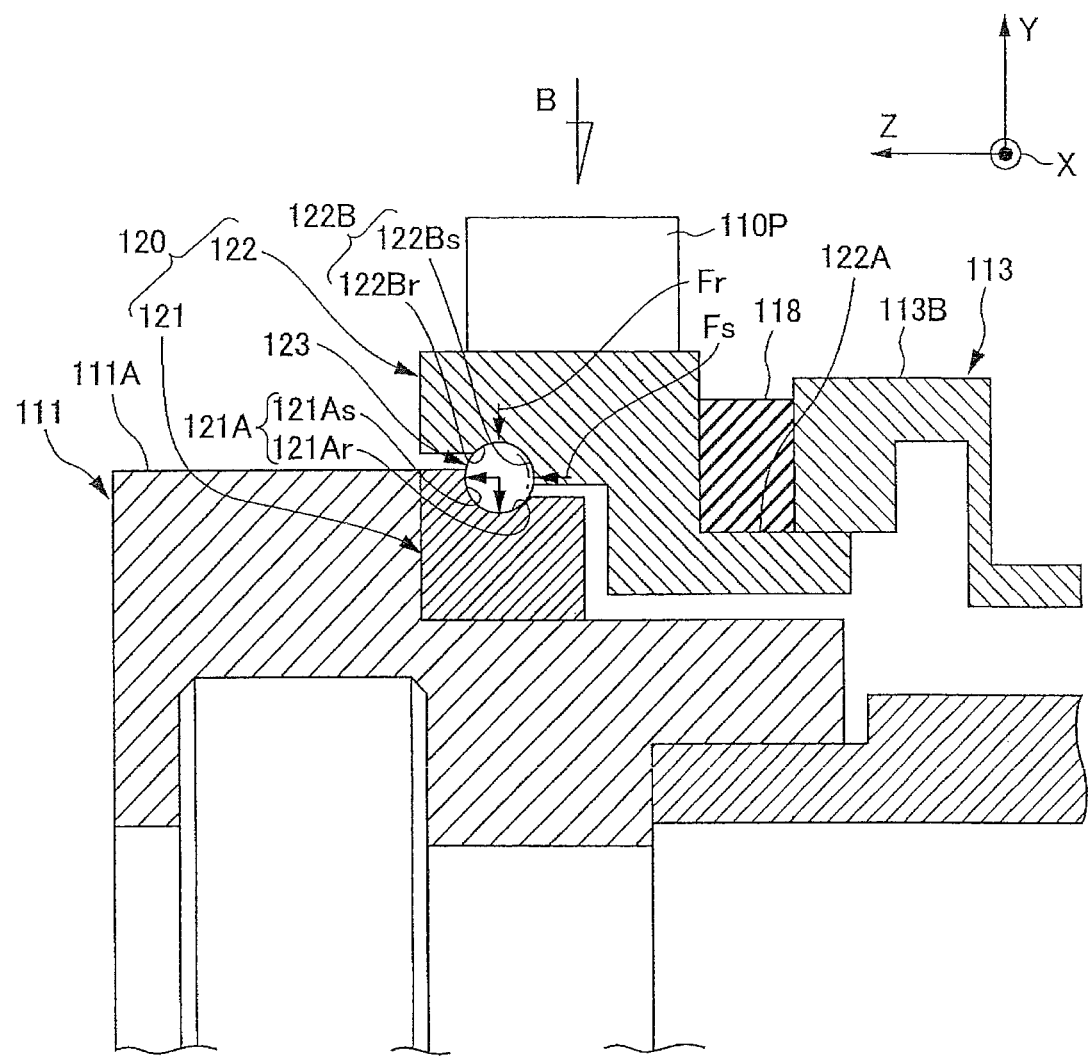
FIG. 4 is an enlarged drawing of the bearing portion in FIG. 3.

FIG. 3 is a cross sectional drawing of the ultrasonic motor 110 according to the second embodiment. FIG. 4 is a an enlarged drawing of a portion of the bearing 120 of FIG. 3.

The ultrasonic motor 110 shown in FIG. 3, in the same way as in the first embodiment, is used for an application such as the rotational driving of a cam tube 5 of a lens barrel 3, but in the present embodiment it is constituted in a ring shape.

Further, the bearing 120 in the ultrasonic motor 110 of the present embodiment is constituted in approximately the same way as the bearing 20 in the previously described first embodiment, and detailed explanations of identical constituent elements are omitted.

The ultrasonic motor 110 is provided with a support ring 111, an vibrating element 112, a rotating body 113, a bearing 120, a pressing portion 115, and a fixing ring 116. Further, the ultrasonic motor 110 is provided with the first damping member 112, the second damping member 119, and the like.

The vibrating element 112 is provided with the elastic body 112A and the piezoelectric body 112B.

The elastic body 112A is a member of approximately annular shape, and at one end face, the piezoelectric body 112B is provided, and at the other face, the comb tooth portion 112Aa is formed, wherein a plurality of grooves are cut and formed. A progressing wave is generated by the vibrations of the piezoelectric body 112E at the tip end faces of the comb tooth portion 112Aa, which form the driving face 112Ad which drives the rotating body 113.

The piezoelectric body 112B has the function of converting electrical energy into mechanical energy. This piezoelectric body 112B has electrodes, not shown in the drawings, which are connected to the flexible printed circuit board, and is excited by driving electric power provided from this flexible printed circuit board.

The rotating body 113 is member having an approximately annular shape, and has the contact face 113A having an approximately annular shape and which contacts the vibrating element 112 (the driving face 112Ad of the elastic body 112A), and the joining portion 113B having a cylindrical shape which joins to the bearing 120 (the outer wheel 122).

In the rotating body 113, the joining portion 113B is fit with the joining portion 122A of the outer wheel 122 of the bearing 120 described later, and thus is joined without allowing rotation relative to the outer wheel 122 via the first damping member 118.

The first damping member 118 is a member of an approximately annular shape formed using rubber or the like. This first damping member 118 has the function of making the rotating body 113 and the outer wheel 122 of the bearing 120 integrally rotatable by its viscoelasticity, and the function of absorbing vibrations of the rotating body 113 so that they are not transmitted to the outer wheel 122.

The bearing 120, in the same way as the bearing 20 in the first embodiment described above, is provided with the inner wheel 121, the outer wheel 122, and the ball 123 disposed between the inner wheel 121 and the outer wheel 122, and is constituted such that the inner wheel 121 and outer wheel 122 can freely rotate relative to each other with low friction by the rolling of the ball 123.

However, the joining portion 122A of the outer wheel 122, to which the rotating body 113 is joined, is at the outer circumference side of the outer wheel 122, and the joining portion 113B of the rotating body 113 is fit to the outer circumference.

Further, at the outer circumference of the outer wheel 122, the output projection 110P protrudes. The output projection 110P engages with, for example, a fork shaped engaging member provided at a member to be driven, and has the function of rotationally driving a member to be driven via the engaging portion.

Namely, the outer wheel 122 has the function of supporting the rotating body 113, and the function of outputting to the outside the rotational driving force of the rotating body 113.

At the bearing 120, the inner wheel 121 is fit to the support ring 111 without allowing relative rotation, and one end face (at the Z axis plus side) is provided so as to abut the flange 111A of the support ring 111.

At the joining portion 122A of the outer wheel 122 of the bearing 120, the joining portion 113B of the rotating body 113 is fit, and is joined via the first damping member 118. In this way, the bearing 120 supports the rotating body 113 so as to be freely rotatable.

The inner rolling face 121A of the inner wheel 121 of the bearing 120 has a radial inner face portion 121Ar and a thrust inner face portion 121As, and the outer rolling face 122B of the outer wheel 122 has a radial outer face portion 122Br and a thrust outer face portion 122Bs. In this way, the bearing 120 is able to receive either of the thrust force Fs or the radial force Fr.

Further, the inner wheel 121 and the outer wheel 122 of the bearing 120 are respectively formed by injection molding or the like by a plastic material. As the plastic material, for example, polyacetal, polyether ether ketone, polybutylene terephthalate, polycarbonate and the like can be used.

On the other hand, the ball 123 is formed of a material such as a stainless alloy steel or a ceramic or the like.

The pressing portion 115 is a part which generates a pressing force to press-contact the vibrating element 112 and the rotating body 113, and is provided with the pressure plate 115A and a plurality of (two in the present embodiment) plate springs 115B. The pressure plate 115A receives the elastic return force generated by the plate springs 115B, and is a plate having an approximately annular shape.

Between the pressing portion 115 and the vibrating element 112, the second damping member 119 is provided.

The second damping member 119 is formed of a non-woven fabric or felt or the like. This second damping member 119 is a member which prevents transmission of the vibrations of the vibrating element 112 to the pressing portion 115 side, and is provided between the piezoelectric body 112B and the pressing plate 115A.

The fixing ring 116 has a disc-shaped major diameter, and is provided at the end portion of the support ring 111. The fixing ring 116 is a member which receives the counter force of the pressing force by the pressing portion 115 which makes the vibrating element 112 press-contact the rotating body 113. Further, the fixing ring 116 has the function of coupling the ultrasonic motor 11 with the rotation of an external operating means (for example, a focus operation ring, zoom operation ring or the like), not shown in the drawings.

At the rear face side (the z axis minus side) of the fixing ring 116, the electric power supply portion 130 is formed.

The electric power supply portion 130 is connected to the piezoelectric body 112B of the vibrating element 112 via the flexible printed circuit board 131, and provides driving electric power to the piezoelectric body 112B via the flexible printed circuit board 131.

In the ultrasonic motor 110 constituted as above, the vibrating element 112 is pressure energized towards the rotating body 113 by the pressing force of the pressing portion 115, and the driving face 112Ad is press-contacted with a predetermined force with the contact face 113A. Then, when two alternating current driving waveforms having different phases are applied to the two electrodes of the piezoelectric body 112B of the vibrating element 112, a progressing wave is generated at the rotating body 113 side of the elastic body 112A by the deformation of the piezoelectric body 112B. The rotating body 113 (contact face 113A) which press-contacts the vibrating element 112 (driving face 112Ad) is friction driven by this progressing wave and rotates. The rotation of the rotating body 113 is transmitted to the outer wheel 122 of the bearing 120 via the first damping member 118, and the outer wheel 122, namely the output projection 110P rotates (revolves) and outputs the rotation power to the outside.

The bearing 120 is able to stably and rotatably support the rotating body 113 while resisting the thrust force Fs by the pressing portion 115 applied to the outer wheel 122 via the rotating body 113. Further, it is able to allow the outer wheel 122 to stably rotate, preventing eccentricity, while resisting the radial force Fr arising when the output projection 110P drives the member to be driven. As a result, it is possible to output to the outside the rotational force with little fluctuation in speed, via the outer wheel (output projection 110P).

Further, in the same way as for the above described first embodiment, the inner wheel 121 and the outer wheel 122 of the bearing 120 are formed of a plastic material. Because of this, the constitution can be light, and further, it is possible to integrally mold the output projection 110P protruding at the outer circumference as described above, and it can be manufactured at low cost.

Third Embodiment

Figure 5:
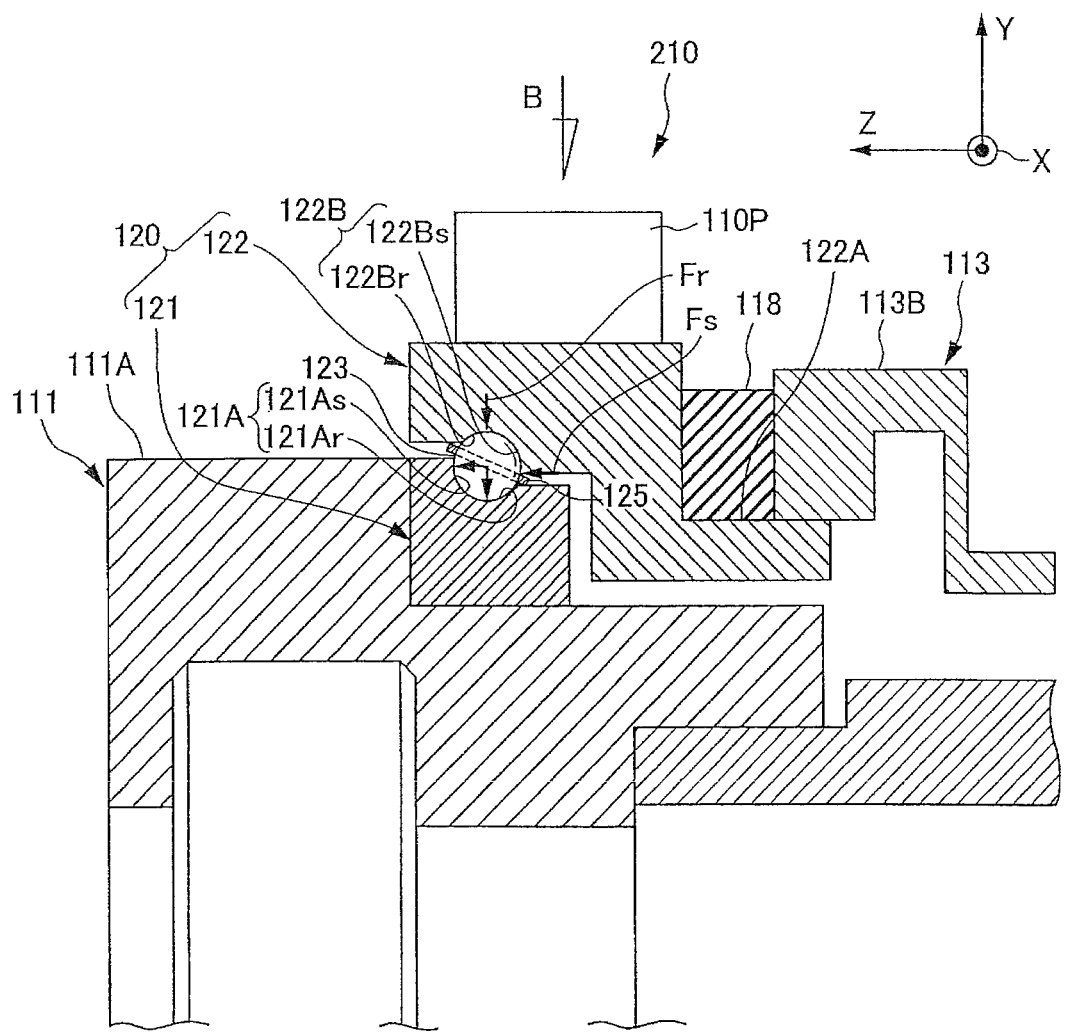
FIG. 5 is a longitudinal cross section drawing of the ultrasonic motor according to the third embodiment of the present invention.

Below, the third embodiment of the present invention will be described with reference to the drawings. FIG. 5 is a longitudinal (axial direction) cross section drawing of the ultrasonic motor 210 of the third embodiment.

The third embodiment is approximately the same as the second embodiment, but differs in the point that the balls 123 are held by the retainer 125. The other parts are the same as for the second embodiment, and thus are assigned the same reference numbers, and explanations thereof are omitted.

The retainer 125 is an annular member extending along the entire circumference of the gap between the inner wheel 121 and the outer wheel 122. Further, as shown in FIG. 5, in the retainer 125, a cross section parallel to the central axis of the retainer 125 is inclined by a prescribed angle with respect to this central axis. Namely, the retainer 125 has a shape wherein a part of the side face of a cone has been cut out to a predetermined width. The side face of the retainer 125 is provided with a plurality of holes, and the balls 123 are rotatably held in these holes.

The retainer 125 is made of plastic, and is formed by injection molding or the like. As the plastic material, for example, polyacetal, polyether ether ketone, polybutylene terephthalate, polycarbonate and the like can be used.

According to the present embodiment, the balls 123 are held by the retainer 125, thus the spacing of the balls 123 is held constant, and it is possible to prevent the balls from contacting each other. In this way, because the balls do not contact each other, there is no generation of contact sounds arising from the balls rubbing with or colliding against each other. Accordingly, it is possible to achieve further silencing of the ultrasonic motor 210 when operating.

Further, because the retainer 125 can be manufactured of plastic, its manufacturing cost can be made low. In addition, the number of the balls 123 can be reduced and the assembling operation becomes simple and easy.

The above embodiments have the following effects.

(1) In the ultrasonic motor 10, 110, or 210, the outer wheel 22 or 122 is made of a substance having plasticity such as a plastic material or the like, and has a lower hardness and higher flexibility than the balls 23 or 123 which are constituted of a metal material or the like. Because of this, when the ultrasonic motor 10, 110, or 210 is driven, the outer wheel 22 or 122 and the balls 23 or 123 contact stably and flexibly, and thus the driving of the ultrasonic motor 10, 110 or 210 can be designed to be stable and quiet.

(2) In the ultrasonic motor 10, 110, or 210, for the bearing 20 or 120 rotatably supporting the rotating body 13 or 113, the inner rolling face 21A or 121A of the inner wheel 21 or 121 has the radial inner face portion 21Ar or 121Ar, and the outer rolling face 22B or 122B of the outer wheel 22 or 122 has the radial outer face portion 22Br or 122Br, and because of this, the outer wheel 22 or 122 can be rotated stably while preventing eccentricities, while resisting the radial force Fr. Further, the outer wheel 22 is formed of a plastic material. Because of this, the degree of freedom in shaping is high, and complex shapes can be also integrally molded, and can be manufactured at low cost.

(3) At the outer circumference of the outer wheel 22 or 122 of the bearing 20 or 120, the output gear 10G or output projection 110P which outputs rotational power to the outside is provided. Because of this, there is no need to provide a separate member for output, and the constitution can have a low cost by reducing the number of parts and the number of assembly steps.

(4) In the bearing 20 or 120 which rotatably supports the rotating body 13 or 113, the inner rolling face 21A or 121A of the inner wheel 21 or 121 has the thrust inner face portion 21As or 121As, and the outer rolling face 22B or 122B of the outer wheel 22 has the thrust outer face portion 22Bs or 122Bs, and because of this, the outer wheel 22 or 122 can be supported to be stably rotatable while resisting the thrust force Fs by the pressing spring 15 or pressing portion 115 operating on the outer wheel 22 or 122 via the rotating body 113.

(5) By disposing the damping member 18 or 118 between the outer wheel 22 or 122 of the bearing 20 or 120, and the rotating body 13 or 113, the vibrations of the rotating body 13 or 113 are absorbed and is it possible to suppress their transmission to the outer wheel 22.

(6) The inner wheel 21 or 121 of the bearing 20 or 120 is formed of a plastic material. Because of this, the degree of freedom in shaping is high, and complex shapes can also be integrally molded, and can be manufactured at low cost.

(7) The camera 1 carries out focus point adjustment by moving the cam tube 5 by the driving of the ultrasonic motor 10 or 110. By this means, smooth focus point adjustment is possible.

(8) Furthermore, in the case of the constitution wherein the balls 123 are held by the retainer 125, there is no generation of contact noise arising from the balls 123 rubbing against or colliding with each other, and it is possible to achieve further silencing of the ultrasonic motor 210. Further, by manufacturing the retainer 125 of plastic, the manufacturing costs can be reduced.

(Modifications)

The present invention is not limited to the above explained embodiments, and many modifications and variations such as those shown below are possible, and these are also within the scope of the present invention.

(1) In the embodiments, explanations were given showing as an example an ultrasonic motor 10 or 110 where the rotating body 13 or 113 rotates as an vibration actuator. However, as the form of the vibration actuator, this is not a limitation, and it may be an ultrasonic motor having a form wherein the support shaft rotates, or an ultrasonic motor of a linear type.

(2) In the embodiments, explanations were given showing as an example an ultrasonic motor 10 or 110 as a vibration actuator, but without being limited to this, for example, it may also be a vibration actuator using vibrations outside of the ultrasonic region.

(3) In the embodiments, an example is shown where the ultrasonic motor 10 or 110 is used as a driving source for the focus point adjustment of the lens barrel 3, but without being limited to this, for example, it may also be a driving source of a zooming operation of a lens barrel 3, or a driving source of a hand shake correction mechanism which corrects hand shake by driving a part of the imaging system of the camera. Furthermore, it may also be applied to a video camera, a mobile phone, or the like.

(4) In the third embodiment, an explanation was given for an example wherein the balls 123 of the second embodiment are held by the retainer 125, but without being limited to this, for example, the balls 23 in the first embodiment may also be held by a retainer.

Further, the embodiments and modifications may be used in appropriate combinations, but detailed explanations are omitted. Further, the present invention is not limited by the embodiments explained above.

What is claimed is:

1. A vibration actuator comprising:
   a vibration portion which contacts a relative movement portion, and which produces necessary vibration for a relative movement of the relative movement portion;
   a first member which is provided so as to hold the relative movement portion between the first member and the vibration portion, and which moves relative to the vibration portion in response to movement of the relative movement portion with respect to the vibration portion;
   a second member which faces the first member via a rolling member, and which supports the first member so that the first member is movable relative to the vibration portion; and
   a pressing member which gives rise to a pressing force between the second member and the vibration portion so that the vibration portion and the relative movement portion are in contact with each other; and wherein
   the first member comprises a plastic substance and joining portion which joins to the relative movement portion in a direction of relative movement of the relative movement portion, and in a direction orthogonal to the direction of the pressing force, and
   the joining portion joins to the relative movement portion via a vibration absorption member in the direction of the pressing force.

2. The vibration actuator according to claim 1 wherein the first member comprises a connection portion which is capable of connecting to the outside, at an outer circumferential face in a direction of relative movement of the vibration portion and the relative movement portion, and in a direction orthogonal to the direction of the pressing force.

3. The vibration actuator according to claim 2, wherein the connection portion is a gear which transmits power.

4. The vibration actuator according to claim 1, wherein the relative movement portion rotates about a central axis relative to the vibration of the vibration portion.

5. The vibration actuator according to claim 1, wherein the rolling member is provided between an outer circumferential face of the second member and an inner circumferential face of the first member.

6. The vibration actuator according to claim 1, wherein the first member faces the second member in a direction of relative movement of the vibration portion and the relative movement portion, and a direction orthogonal to a direction of the pressing force.

7. The vibration actuator according to claim 1, wherein the rolling member is provided between the first member and the second member, when seen in a direction of the pressing force.

8. The vibration actuator according to claim 1, wherein the first member is made of plastic.

9. The vibration actuator according to claim 1, wherein the second member comprises a plastic substance.

10. The vibration actuator according to claim 1, wherein the rolling member is a metal sphere.

11. The vibration actuator according to claim 1, wherein the rolling member is held by a retainer made of plastic.

12. An electric device comprising the vibration actuator according to claim 1.

* * * * *